UNITED STATES PATENT OFFICE.

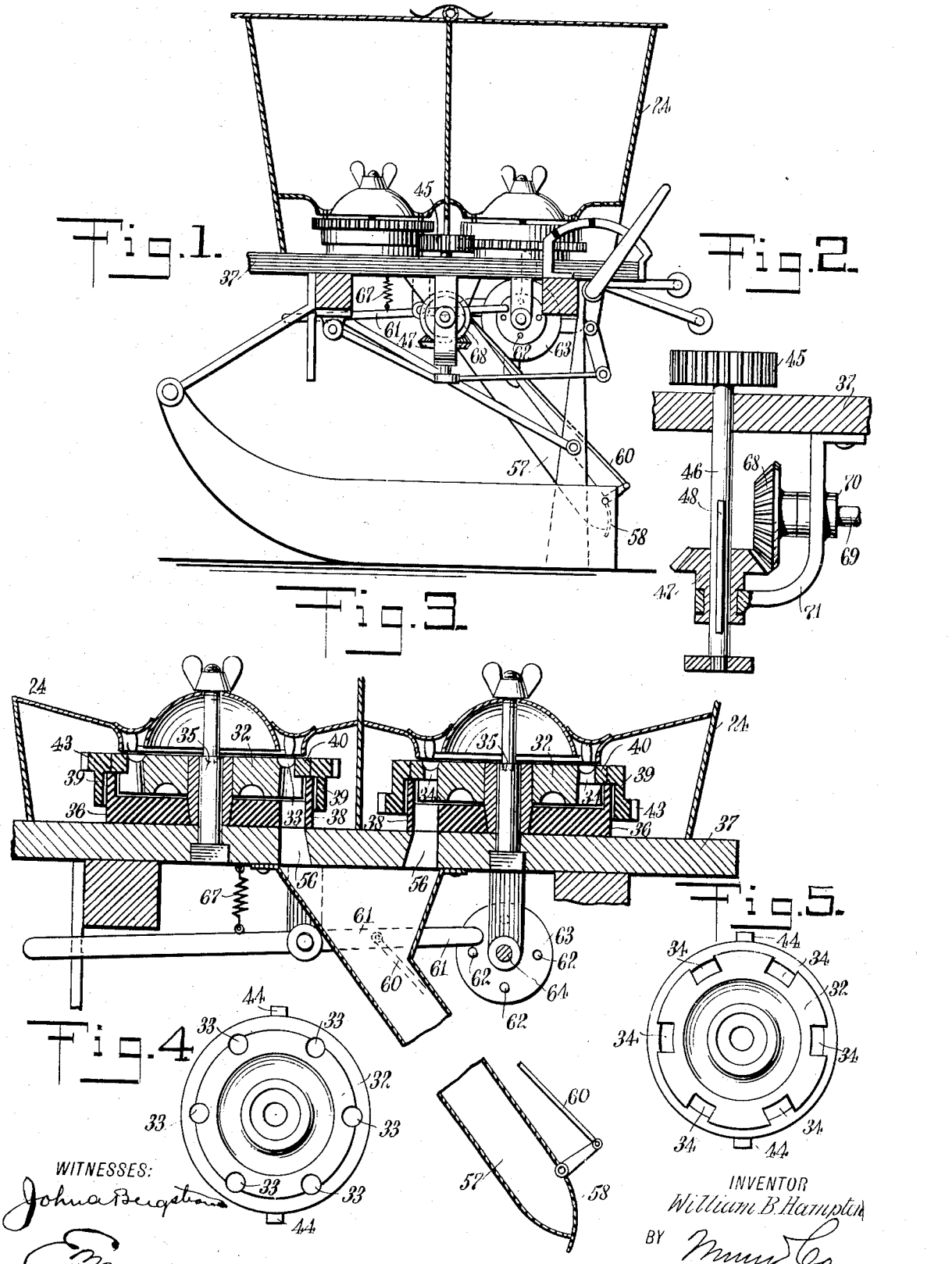

WILLIAM B. HAMPTON, OF SPRINGFIELD, MISSOURI.

CHECK-ROW PLANTER.

1,111,577.  Specification of Letters Patent.  Patented Sept. 22, 1914.

Application filed August 3, 1910. Serial No. 575,209.

*To all whom it may concern:*

Be it known that I, WILLIAM B. HAMPTON, a citizen of the United States, and a resident of Springfield, in the county of Green and State of Missouri, have invented a new and Improved Check-Row Planter, of which the following is a full, clear, and exact description.

Among the principal objects which the present invention has in view is to provide means for separating the grains to be planted, whereby the same are more evenly distributed than by the operation of machines as at present constructed.

One embodiment of the present invention is disclosed in the structure illustrated in the accompanying drawings, in which like characters of reference denote corresponding parts in all the views, and in which—

Figure 1 is a detail view in vertical longitudinal section, showing the construction and arrangement of seed hoppers and feeding mechanism mounted therein; Fig. 2 is a detail view, on enlarged scale, of transmission mechanism for driving the seed disks; Fig. 3 is an enlarged view, in vertical section, of the dropping mechanism; Fig. 4 is a detail view, on an enlarged scale, of a dropper plate; Fig. 5 is a detail view, on an enlarged scale, showing the lower face of a second dropper plate employed in conjunction with this invention.

The present invention is an improvement upon a patent heretofore granted to me, being for a planter, No. 883,014, issued March 24, 1908, cross reference to which is herein made.

The dropper plate, as shown in the drawing, is provided with elongated and relatively enlarged pockets 34, 34, to receive kernels of corn. Each of the plates is mounted upon the upper edge of the flange 38, to revolve about the pins 35, 35. The base plates 36, 36, the flanges 38, 38, and the pins 35, 35, are fixedly secured on the bottom 37 of the hopper 24. The annular flanges 38 are rigidly secured to the said base plates 36, and form, in conjunction with the plates 32, a series of pockets or receptacles from which the seeds and corn are delivered as each pocket rotates over the channels 56. Loosely mounted on the flanges 38, 38 are gear-toothed rings 39, 39. The rings 39, 39 are suspended by internal flanges 40, and are provided on their outer peripheries with cog teeth 43, 43. The flanges 40 have recess pockets to receive laterally-extended ears 44, 44, whereby each of the plates 32, 32 is suspended upon the rings 39, 39.

It will be understood that the object in the operation of this machine is to drop two different kinds of seeds in the same row or same hill simultaneously or separately. When the pinion 45 is adjusted to engage both the rings 39, 39, then the seed carried in both compartments of the hopper 24, are delivered to the boot 57 at the same time. When it is desired to plant only the one kind of seed from the one compartment of the hopper, then the spindle 46 and pinion 45 are moved to engage only one of the rings 39, the opposite ring remaining immovable.

To facilitate the passage of the seeds from the plates 32, 32, the plates 36 are recessed in line with the channels 56, so that when the perforations 33 and openings 34 aline with the said recesses, the seed is freed from the pockets.

The rings 39, 39 are rotated by an interposed pinion 45, which is mounted at the upper end of a spindle 46. The spindle 46 is slidably mounted in bearings in the bottom 37 and in a bevel gear 47, to which it is rotatively connected by a key 48. To lift the spindle 46 and the pinion 45 connected therewith, I provide the thrust bearing 49.

In each of the base plates 36 is formed a channel through which the seeds carried in the perforations 33 and openings 34 are delivered into a spout 57. The spout 57 is closed by a lid 58 and a connecting rod 60 connected therewith and to an operating bar 61. The end of the dropper bar 61 is extended in the path of pins 62, 62. The pins 62, 62 are extended from the face of disks 63, which disks are mounted upon a shaft 64. The bar 61 is maintained in position to close the lid 58 by a spiral spring 67.

The bevel gears 47 are mounted in toothed engagement with bevel gears 68. The bevel gears 68 are fixedly mounted upon a shaft 69, which shaft 69 is provided with bearings 70 formed in bracket arms 71.

Claim:

A seed dropping mechanism, comprising a rotary plate having a plurality of dropping perforations, said perforations having peripheral openings below the upper surface of said plate, said perforations being limited to receive a single seed; a stationary base plate recessed for holding said rotary plate and for closing laterally said peripheral openings, said base plate having a perforation disposed in the path of the perforations in said rotary plate to receive and deliver the seeds held therein; and means for rotating said rotary plate.

In testimony whereof I have signed this specification in the presence of two subscribing witnesses.

WILLIAM B. HAMPTON.

Witnesses:
J. C. WEST,
ED. JOHNSON.